(12) United States Patent
Polzer et al.

(10) Patent No.: US 6,666,500 B2
(45) Date of Patent: Dec. 23, 2003

(54) VEHICLE CONSTRUCTION AND METHOD OF MAKING SAME

(75) Inventors: Patrick Polzer, Muehlacker (DE); Ruediger Jahn, Leonberg (DE)

(73) Assignee: Dr. Ing. h.c.F. Porsche AG, Stuttgart (DE)

( * ) Notice: Subject to any disclaimer, the term of this patent is extended or adjusted under 35 U.S.C. 154(b) by 0 days.

(21) Appl. No.: 10/273,361

(22) Filed: Oct. 18, 2002

(65) Prior Publication Data

US 2003/0085590 A1 May 8, 2003

(30) Foreign Application Priority Data

Oct. 19, 2001 (DE) .......................... 101 51 768

(51) Int. Cl.[7] ................................. B60N 2/00
(52) U.S. Cl. ...................... 296/187.12; 296/193.05; 296/205; 296/207.03; 296/209
(58) Field of Search .................. 296/187.01, 187.03, 296/187.12, 193.05, 193.06, 205, 203.03, 209

(56) References Cited

U.S. PATENT DOCUMENTS

| | | | | |
|---|---|---|---|---|
| 5,544,930 A | * | 8/1996 | Stedman .................. 296/146.6 |
| 6,193,306 B1 | * | 2/2001 | Lee ........................ 296/209 |
| 6,283,539 B1 | * | 9/2001 | Enning et al. ........ 296/203.03 |
| 6,386,625 B1 | | 5/2002 | Dukat et al. |
| 6,409,257 B1 | * | 6/2002 | Takashina et al. .......... 296/209 |

FOREIGN PATENT DOCUMENTS

| | | | | |
|---|---|---|---|---|
| DE | 3011345 | * | 1/1981 | |
| DE | 4016730 | * | 11/1991 | ................ 296/205 |
| DE | 19603098 | * | 7/1997 | |
| DE | 199 54 292 | | 5/2001 | |
| JP | 401018784 | * | 1/1989 | ................ 296/209 |
| JP | 6099581 | * | 4/1994 | ............ 296/203.03 |

* cited by examiner

Primary Examiner—Stephen T. Gordon
Assistant Examiner—H. Gutman
(74) Attorney, Agent, or Firm—Crowell & Moring LLP

(57) ABSTRACT

A reinforcement, which is arranged in the side member of a vehicle body and comprises a reinforcing tube, is connected by way of fastening consoles with the vehicle body or with the columns of the vehicle body. So that tolerances of the reinforcing tube can be compensated and the center vehicle column is not deformed, compensating elements are connected between the center fastening console and the reinforcing tube, to which the fastening console can be fastened while tolerances are compensated and can be connected with the B-column.

18 Claims, 4 Drawing Sheets

VEHICLE CONSTRUCTION AND METHOD OF MAKING SAME

BACKGROUND AND SUMMARY OF THE INVENTION

This application claims the priority of German Patent Document 101 51 768.8, filed on Oct. 19, 2001, the disclosure of which is expressly incorporated by reference herein.

The invention relates to a vehicle having a reinforcement arranged in the side member of a vehicle body comprising a tube element which is connectable by way of end-side fastening consoles and a center fastening console with columns of the vehicle.

From German Patent Document DE 199 54 292 A1 and corresponding U.S. Pat. No. 6,386,625, a reinforcing tube in a side member of a vehicle is known which is connected with the vehicle body by way of the vehicle columns. In a first step, such a reinforcing tube is fastened to the outer vehicle columns A and C, and subsequently, in a second step, a fastening takes place on the center B-column. Because of tolerances and also because of thermal stress, the reinforcing tube may have a shape which deviates from its longitudinal axis; that is, the reinforcing tube is provided with a so-called bulging in some direction.

It is an aspect of the invention to provide a fastening of the reinforcing tube to the center B-column in a manner by which the reinforcing tube can be fastened even in the case of a shape deviating from its longitudinal axis without any deformation of the vehicle body structure.

According to certain preferred embodiments of the invention, this aspect is achieved in that the center fastening console is fastenable to the reinforcing tube element by way of compensating elements for which the compensating elements have projecting tilted-out fastening tabs which are connectable with the center fastening console. Additional advantageous characteristics are contained in other preferred embodiments.

Principal advantages achieved by way of certain preferred embodiments of the invention are that, also in the case of a bent or bulging reinforcing tube, a fastening can take place on the B-column of the vehicle body without resulting in a deformation of this B-column, which occurs when the reinforcing tube bulges toward the outside. In order to ensure a firm fastening of the reinforcing tube which avoids deformations on the B-column, it is provided that the center fastening console can be fastened on the reinforcing tube by way of compensating elements, for which the compensating elements have projecting fastening tabs which can be connected with the fastening console.

In particular, the compensating elements are half-shells which face the fastening console and are welded to the reinforcing tube, and the fastening tabs are tilted at a right angle out of the plane of the half-shells. At their respective outer edge, the fastening tabs have a semicircularly surrounding construction, and the additional fastenings tabs are provided in each case only in sections at the inner edge. By way of these fastening tabs at the compensating elements, tolerances on the reinforcing tube can be absorbed which are caused by a shape of the reinforcing tube deviating from the longitudinal axis. This means that the fastening console can be connected without tension with the B-column.

In the assembled condition, the fastening console is arranged between the semicircularly surrounding fastening tabs of the compensating elements, and the additional interior fastening tabs provided in sections project through slots of the fastening console. As a result, the fastening console is advantageously held in position with respect to the column, and a connection with the compensating elements can be established in a simple manner by welding.

By way of the compensating elements provided with the fastening tabs, a reinforcing tube having tolerances can be compensated, no matter in which direction a bulging occurs, because in every case the fastening console will be disposed with a radial play between the outer and the inner fastening tabs. As a function of the fastened position of the reinforcing tube on the A and C columns of the vehicle, the fastening console is thereby arranged, with respect to the compensating elements, such that a reinforcing tube deviating from the longitudinal axis can be fastened on the B-column of the vehicle by way of the fastening console spaced away from the compensating elements.

Other objects, advantages and novel features of the present invention will become apparent from the following detailed description of the invention when considered in conjunction with the accompanying drawings.

DETAILED DESCRIPTION OF THE DRAWINGS

Figure 1:
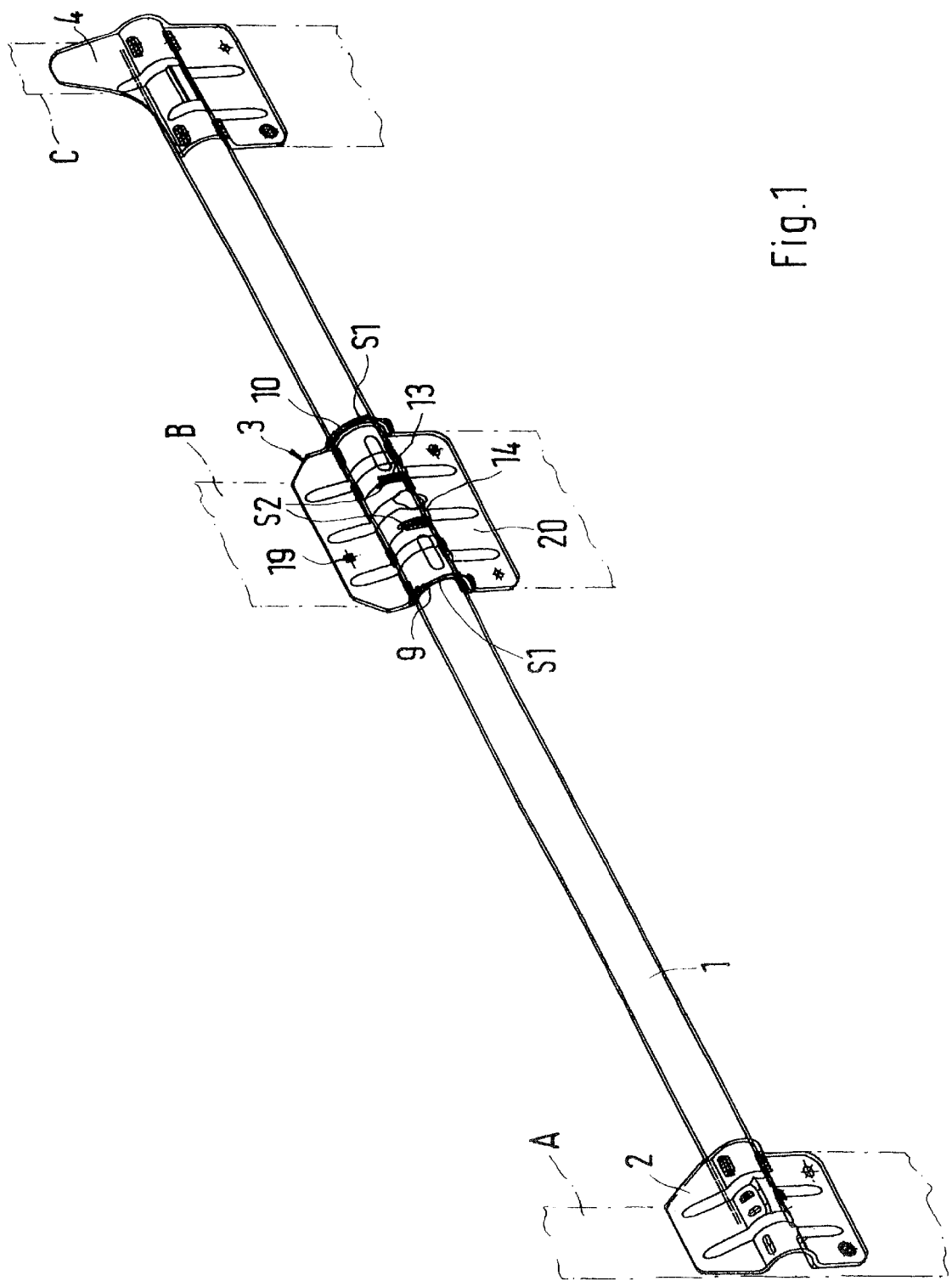
FIG. 1 shows a diagrammatic representation of a reinforcing tube with end-side fastening consoles for A- and C-columns and a center console with an intermediate compensating element for a B-column.

A reinforcing tube 1 is arranged in the side member Ls of a vehicle for crash absorption and, for this purpose, is fastened to an A-, B- and C-column in the vehicle body. In FIG. 1, these A-, B- and C-columns are schematically outlined.

For the connection with these vehicle columns A, B and C, fastening consoles 2, 3 and 4, respectively, are provided which console 3 can be connected with the vehicle column B either directly or by way of one or several compensating elements 5, 6 situated side-by-side.

In the embodiment shown in FIG. 1, the fastening consoles 2 and 4 are connected at the free ends of the reinforcing tube 1 directly by way of welds to Columns A and C. The center console 3 is indirectly fastened to the B-column by way of compensating elements 5 and 6.

Figure 2:
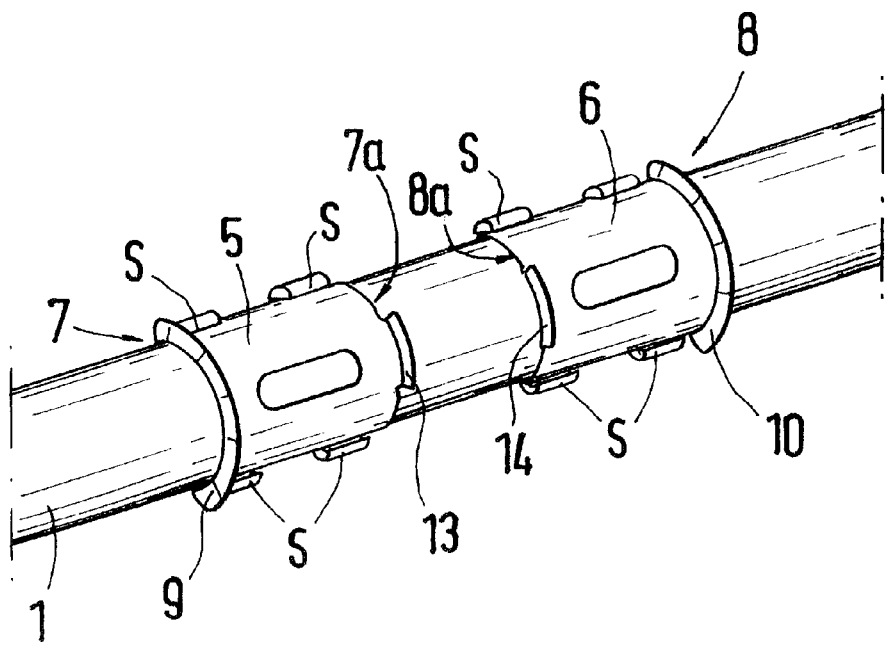
FIG. 2 shows an enlarged diagrammatic representation of the compensating elements.

As shown, among other things, in FIG. 2, the compensating elements 5, 6 consist of half-shells which face the fastening console 3. The compensating elements 5, 6 are each fixedly connected by way of several welds S with the reinforcing tube 1. The fastening console 3 is placed on these compensating elements 5, 6, is positioned and is fastened by welds S1 and S2. For this purpose, the compensating elements 5, 6 have, in each case, projecting or tilted-out fastening tabs 9, 10 on the exterior edge 7, 8 and additional tilted-out fastening tabs 13, 14 on the interior edge 7a, 8a, which may be provided only in sections.

Figure 5:
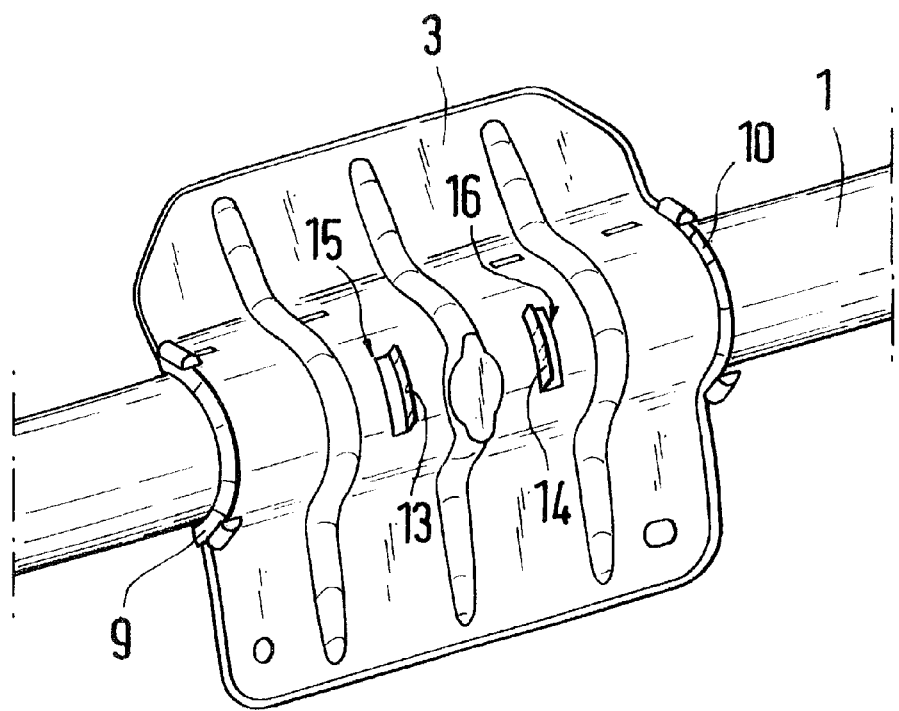
FIG. 5 shows a diagrammatic representation of the fastening console placed on fastening tabs of the compensating element.
Figure 3:
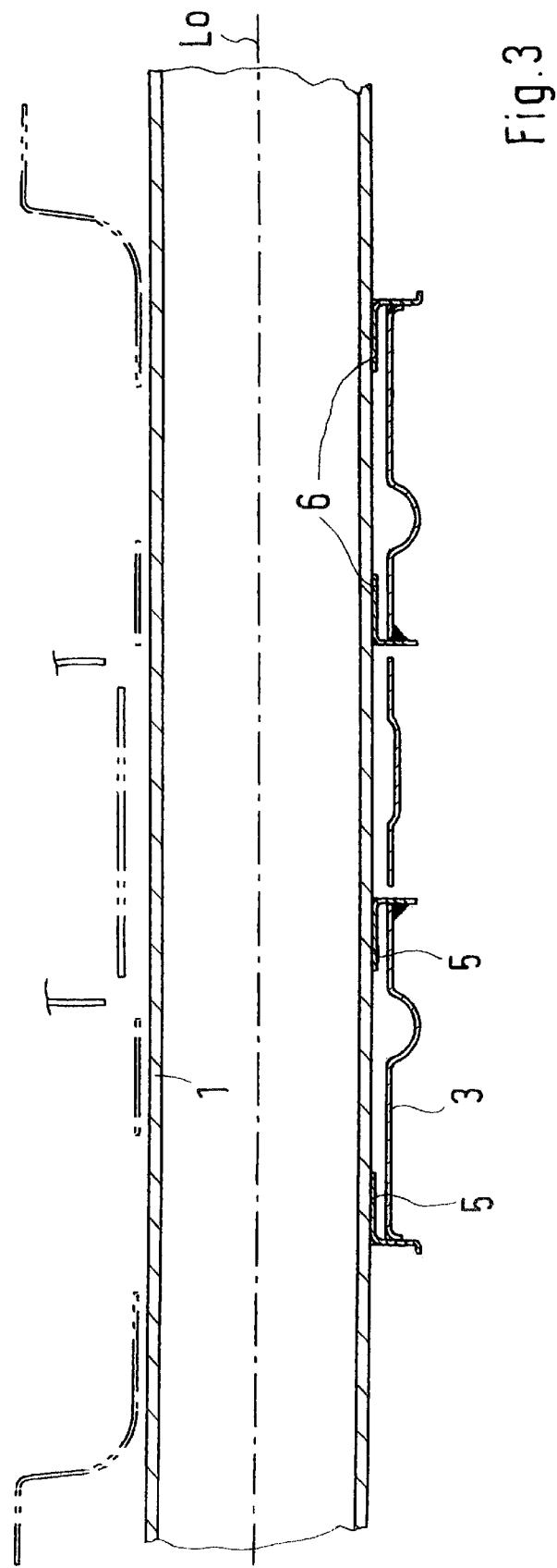
FIG. 3 shows a horizontal sectional view of the reinforcing tube with a fastening console and compensating elements.
Figure 4:
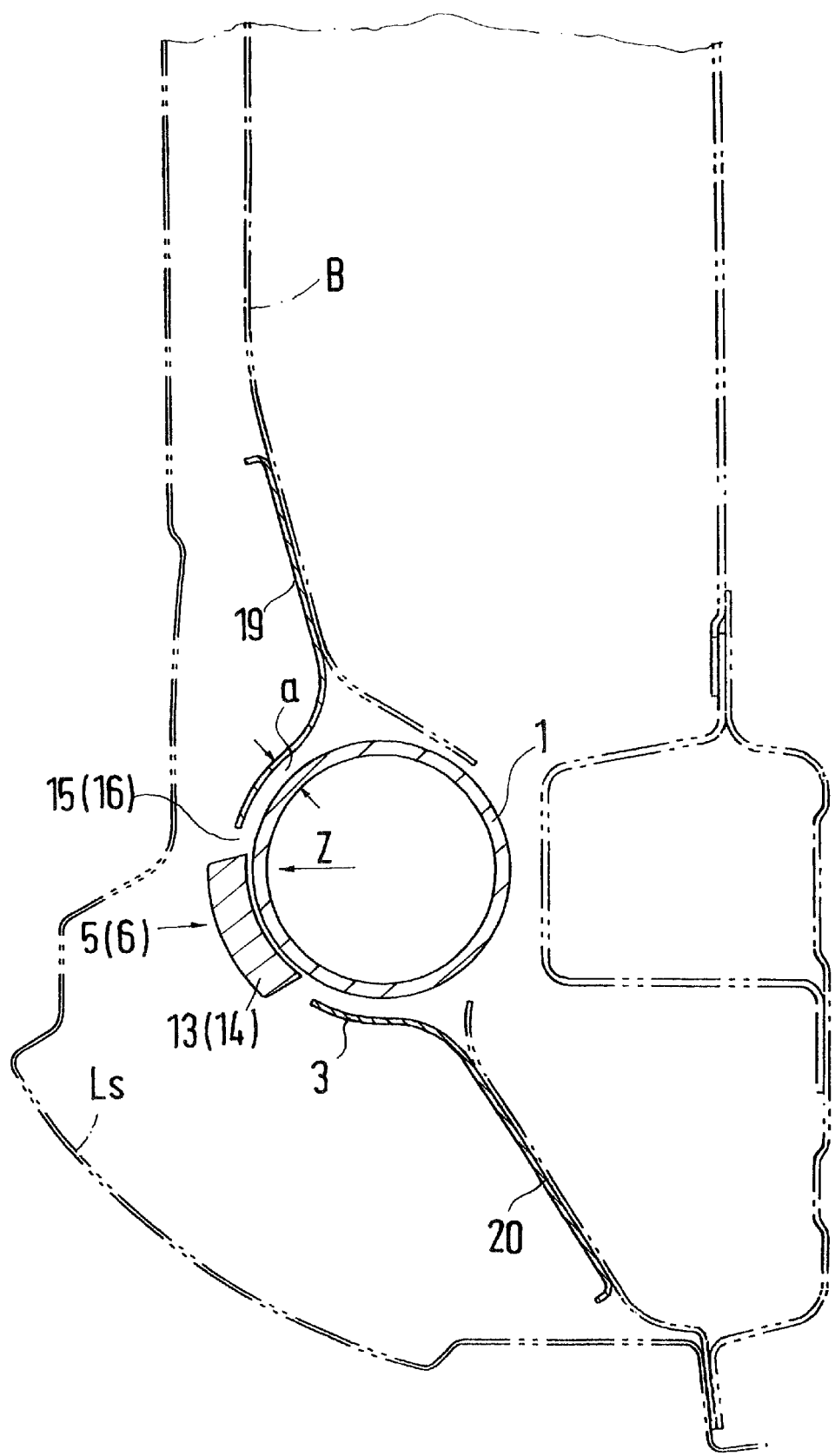
FIG. 4 shows a vertical sectional view of the reinforcing tube with compensating elements and the fastening console.

As shown in FIG. 1 in conjunction with FIGS. 4 and 5, the fastening console 3 is arranged between the exterior fastening tabs 9 and 10, whereas the interior fastening tabs 13, 14 project through slots 15, 16 in the fastening console 3. A fastening of this console 3 on the compensating elements 5, 6 takes place by way of a welding (S1 and S2) of the fastening tabs 9, 10 and 13, 14 to the fastening console 3, which is shown in detail in FIG. 1 and in FIG. 5.

The connection of the reinforcing tube 1 with the vehicle column A, B and C is implemented in such a manner that first a fastening of the reinforcing tube 1 takes place to the columns A and C by way of the fastening consoles 2 and 4 connected with the tube 1. Since the reinforcing tube 1 may deform as a result of thermal stress, or the reinforcing tube 1 already has a deformation in the longitudinal direction or to the longitudinal axis Lo in the supplied condition, the compensating elements 5 and 6 are fitted on for compensating these deviations and are connected with the tube 1. When the tube 1 has, for example, a bulging in the Z-direction (FIG. 4), in the normal case, no connection with the B-column can take place without compensating elements 5, 6, unless the B-column is inappropriately deformed. In order to absorb this degree of deviation a by a bulging of the tube 1, the fastening console 3 can be fitted onto the compensating elements 5, 6 and can be connected by way of the fastening tabs 9, 10 and 13, 14 with the tube 1 while absorbing the tolerances. The connection of the fastening console 3 with the B-column takes place directly by way of the legs 19 and 20 of the fastening console 3.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A vehicle having a reinforcement which is arranged in a side member of a vehicle body and comprises a tube element which is connectable by way of end-side fastening consoles and a center fastening console with columns of the vehicle, wherein the center fastening console is fastenable to the reinforcing tube element by way of compensating elements, for which the compensating elements have projecting tilted-out fastening tabs which are connectable with the center fastening console.

2. The vehicle according to claim 1, wherein the compensating elements comprise half-shells facing the center fastening console, said half-shells being fastenable to the reinforcing tube element in a welded-on manner, and the fastening tabs being tilted out at a right-angle from a plane of the half-shells.

3. The vehicle according to claim 1, wherein the fastening tabs are each constructed at an outer edge in a semicircularly surrounding manner, and additional fastening tabs extend in each case only in sections at an inner edge of the compensating elements.

4. The vehicle according to claim 2, wherein the fastening tabs are each constructed at an outer edge in a semicircularly surrounding manner, and additional fastening tabs extend in each case only in sections at an inner edge of the compensating elements.

5. The vehicle according to claim 1, wherein, in an assembled condition, the center fastening console is arranged between the fastening tabs of the compensating elements, and additional interior fastening tabs provided in sections are arranged to project through slots of the fastening console.

6. The vehicle according to claim 2, wherein, in an assembled condition, the center fastening console is arranged between the fastening tabs of the compensating elements, and additional interior fastening tabs provided in sections are arranged to project through slots of the fastening console.

7. The vehicle according to claim 3, wherein, in an assembled condition, the center fastening console is arranged between the fastening tabs of the compensating elements, and the additional interior fastening tabs provided in sections are arranged to project through slots of the fastening console.

8. The vehicle according to claim 1, wherein, as a function of a fastened position of the reinforcing tube element, the center fastening console is arranged with respect to the compensating elements such that the reinforcing tube element, which may deviate from a longitudinal axis, is fastenable to a B-column of the vehicle body by way of the center fastening console which is spaced with respect to the compensating elements at a distance.

9. The vehicle according to claim 2, wherein, as a function of a fastened position of the reinforcing tube element, the center fastening console is arranged with respect to the compensating elements such that the reinforcing tube element, which may deviate from a longitudinal axis, is fastenable to a B-column of the vehicle body by way of the center fastening console which is spaced with respect to the compensating elements at a distance.

10. The vehicle according to claim 3, wherein, as a function of a fastened position of the reinforcing tube element, the center fastening console is arranged with respect to the compensating elements such that the reinforcing tube element, which may deviate from a longitudinal axis, is fastenable to a B-column of the vehicle body by way of the center fastening console which is spaced with respect to the compensating elements at a distance.

11. The vehicle according to claim 5, wherein, as a function of a fastened position of the reinforcing tube element, the center fastening console is arranged with respect to the compensating elements such that the reinforcing tube element, which may deviate from a longitudinal axis, is fastenable to a B-column of the vehicle body by way of the center fastening console which is spaced with respect to the compensating elements at a distance.

12. A reinforcement assembly for a vehicle, comprising:
    at least one end-side fastening console,
    a center fastening console,
    a reinforcing tube element which is connectable to columns of the vehicle via the consoles, and
    at least one compensating element to fasten the center console to the tube element,
    wherein the at least one compensating element is arrangeable to compensate for deviations in the tube element.

13. The reinforcement assembly according to claim 12, wherein the compensating element comprises at least one fastening tab which is connectable with the center fastening console.

14. A method of making a reinforcement assembly for a vehicle, comprising:
    arranging a reinforcement which comprises a tube element in a side member of a vehicle body,
    connecting the tube element to columns of the vehicle via end-side fastening consoles, and
    connecting the tube element to another column of the vehicle via fastening the tube element to a center fastening console via compensating elements, wherein the compensating elements have projecting tilted-out fastening tabs that are connectable with the center fastening console.

15. The method according to claim 14, wherein the compensating elements are arranged to compensate for deviations in the tube element.

16. The method according to claim 14, wherein the compensating elements comprise half-shells facing the center fastening console, said half-shells being fastenable to the reinforcing tube element in a welded-on manner, and the fastening tabs being tilted out at a right-angle from a plane of the half-shells.

17. The method according to claim 14, wherein the fastening tabs are each constructed at an outer edge in a semicircularly surrounding manner, and additional fastening tabs extend in each case only in sections at an inner edge of the compensating elements.

18. The method according to claim 14, wherein, in an assembled condition, the center fastening console is arranged between the fastening tabs of the compensating elements, and additional interior fastening tabs provided in sections are arranged to project through slots of the fastening console.

* * * * *